May 26, 1959

R. J. GILMAN 2,888,558

FREQUENCY SHIFT DISCRIMINATOR

Filed Nov. 18, 1954

ROBERT JOSEPH GILMAN
INVENTOR.

BY Rudolph J. Juick
ATTORNEY

United States Patent Office 2,888,558 Patented May 26, 1959

2,888,558

FREQUENCY SHIFT DISCRIMINATOR

Robert Joseph Gilman, Preakness, N.J., assignor to Radio Frequency Laboratories, Inc., Boonton, N.J., a corporation of New Jersey Application November 18, 1954, Serial No. 469,625

9 Claims. (Cl. 250—27)

This invention relates to a frequency shift discriminator and more particularly to a novel electronic circuit converting variations in the frequency of an input signal to variations in a D.-C. voltage output.

Although my invention has general application in the field of electronic apparatus it is particularly suitable for use as a discriminator for a frequency shift teletype converter that forms part of a teleprinter communication system operating on radio circuits or wire lines. In one class of teleprinter, coded radio waves of two different frequencies are transmitted in alternate sequence, each succession of wave pulses having a precise time duration measured, generally, in milliseconds. Various characters, figures, punctuation marks, etc. are represented by individual combinations of the two wave pulses in accordance with the standard radiotype code and these coded sequences are translated at the receiver-converter into direct current pulses of corresponding time duration. Such direct current pulses are employed to set up an electromagnetic selector mechanism whereby the corresponding character automatically is imprinted on a sheet of paper. While a single frequency system operating as a simple "on-off" code arrangement may be employed for teleprinter purposes, it has been found that random electrical and/or radio energy disturbances, either external to or within the receiver-converter, produce spurious operations of the printing mechanism. Consequently, present accepted practice employs the two frequency system, said frequencies being in the radio spectrum, say, 2 megacycles, with a frequency separation of 850 cycles. It is common practice to designate one of the frequencies as the Space signal and the other as a Mark signal. Thus, the transmission of the letter "A" comprises: a Space signal (2 megacycles) for 22 milli seconds, followed by a Mark signal (2 megacycles+850 cycles) for 44 milliseconds, followed by a Space signal (2 megacycles) for 66 milliseconds, followed by a Mark signal (2 megacycles+850 cycles) for 31 milliseconds. Such signal sequence is heterodyned down to an intermediate frequency in the receiving apparatus that also includes a discriminator type of demodulator to distinguish between the Mark and Space signal frequencies. Only the Mark signals are effective to cause actuation of the selector magnet mechanism in the form of D.-C. current pulses. These D.-C. current pulses, which vary in time duration and time spacing, set up the selector mechanism for the power operation of the type bar corresponding to the particular code character received.

My novel discriminator-converter circuit offers numerous advantages over prior circuits employed for this purpose as will be described in detail hereinbelow.

An object of this invention is the provision of a novel frequency shift discriminator capable of converting variations in the frequency of an incoming signal into selected variations in a D.-C. voltage output.

An object of this invention is the provision of a frequency shift discriminator having a sharp response characteristic, high stability and capable of operation over a wide range of frequency variations without adjustment.

An object of this invention is the provision of a frequency shift discriminator capable of providing a D.-C. voltage output variation of substantially 100 volts in response to a .05 percent change in the frequency of an applied input signal.

An object of this invention is the provision of a frequency shift discriminator comprising an electron tube having a plurality of control grids, a first circuit including a crystal tuned to a selected frequency, circuit elements for impressing an incoming signal across the crystal through a tuned L-C circuit, circuit elements applying the voltage across said tuned circuit to one grid of the tube, a second circuit including a reactance, circuit elements for impressing the incoming signal across said reactance and means applying the voltage across said reactance to a second grid of the tube.

An object of this invention is the provision of a circuit for providing a D.-C. output voltage which varies in accordance with variations in the frequency of an input signal said circuit comprising an electron tube having a plate resistor across which the D.-C. output voltage is developed, means for applying the input signal to a first control grid of the tube through a reactance, means for applying the input signal to a second control grid of the tube through a crystal tuned to a selected frequency, and a tuned L-C circuit connected between the said second control grid and ground.

An object of this invention is the provision of a frequency shift discriminator comprising a gated beam electron tube, a transformer having a primary winding energized by the incoming A.-C. signal and a center tapped secondary winding, a reactance connected to the third control grid of the tube and across the transformer secondary winding, a crystal connected between one end of the transformer secondary winding and the first control grid of the tube, a capacitor connected between the said first control grid and the other end of the transformer secondary winding, and a tuned circuit connected between the said first control grid and the center tap of the transformer secondary winding.

These and other objects and advantages of the invention will become apparent from the following description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views.

Figures 1, 2, 3, 4, 5:
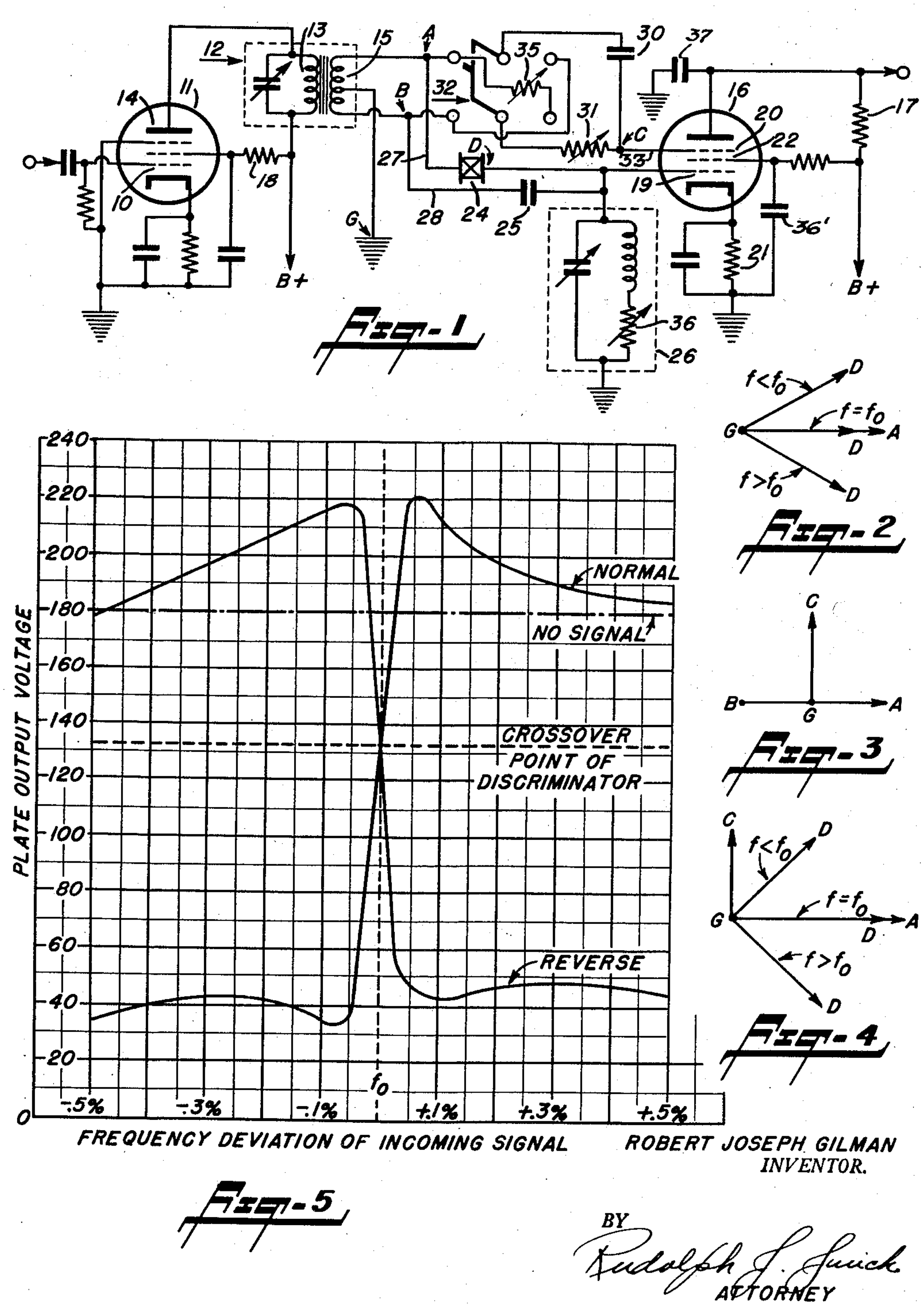
Figure 1 is a circuit diagram of a frequency shift discriminator made in accordance with this invention.
Figure 2 is a vector diagram showing the relative phase shift of the voltage applied to one control grid of the electron tube as the frequency of the incoming signal varies from the natural frequency of the crystal.
Figure 3 is a vector diagram showing, in the normal condition, the 90 degree phase relation between the voltage applied to the other control grid of the tube and the input reference voltage in the general range of the natural frequency of the crystal.
Figure 4 is a combination of Figures 2 and 3.
Figure 5 is a set of curves showing a typical variation in the D.-C. output voltage of the circuit in accordance with variations in the incoming signal from the natural frequency of the crystal.

Reference is now made specifically to the circuit diagram of Figure 1. The incoming signal is applied to the control grid 10 of the tube 11, here shown as a pentode having its electrodes biased in the normal manner. This tube serves several functions; namely, as a signal voltage amplifier, a voltage limiter and as a means for matching the impedance of the output transformer 12 having a tuned primary winding 13 connected between the tube anode 14 and through resistor 18 to a grid of the tube 11, and also to the B+ side of the anode-biasing potential source. The secondary winding of the transformer comprises a center tapped winding 15 grounded as shown, which thereby connects it to the negative terminal of the B power source.

The control tube 16 is of the gated beam type, such as 6BN6, having the load impedance 17 in the anode circuit, said anode being also grounded through a filtering capacitor 37. Such electron tube has two control grids 19 and 20 and a high transconductance between each control grid and the anode, that is, both grids exercise a high degree of control over the electron stream through the tube, and the switching of the plate current between cut-off and its limited value requires only a relatively low input signal on either control grid. Since such tube has essentially a constant cathode current regardless of the control electrode potentials, a cathode resistor 21 may be used to develop a bias on the grid 22 through capacitor 36 to cut-off the flow of plate current when no signal is applied to the control grids 19 and 20. When radio frequency signals are applied to the control grids 19 and 20 each grid will tend to throw the tube into a condition of complete cut-off or complete conduction in accordance with the instantaneous polarity of the applied signals. Inasmuch as either of the grids 19 and 20 can cut-off the flow of plate current the tube will conduct only during that portion of the radio frequency cycle for which these two grids 19 and 20 are positive at the same time. By varying the relative phase of the signals applied to the control grids the length of time that the tube conducts can be varied. It will be apparent, therefore, that the tube conducts in pulses of equal height and at a rate corresponding to the frequency of the incoming signals but that the width of these pulses varies according to the phase displacement of the two grids. If a filter is placed into the plate circuit to change these pulses into D.-C. the average of such D.-C. pulses will vary as the width of the pulses vary.

The phase of the voltage applied to the first control grid 19, of the tube 16, is determined by a network consisting of the secondary transformer winding 15, crystal 24, capacitor 25 and the impedance of the L-C circuit 26. It will be noted that the crystal 24 is connected to one end of the transformer secondary winding by the lead 27, that the capactior 25 is connected to the other end of the winding by the lead 28, and that the crystal and capacitor are connected directly to the control grid 19 and to the ungrounded side of the L-C circuit 26. The L-C circuit is tuned approximately to the natural frequency of the crystal, $f_o$. The tuned circuit, which remains primarily resistive within the operating range of the discriminator, is necessary to offer a high resistive impedance to RF currents in order to develop sufficient voltage to drive the grid and yet offer a low D.-C. impedance to the grid current which the tube normally draws. It is here pointed out that the capacitor 25 forms a bridge circuit with the crystal and the transformer secondary winding and cancels out the effect of the holder capacity of the crystal. Consequently, the crystal can be considered as a series tuned circuit.

When the frequency, $f$, of the signal applied to the transformer 12 is equal to the resonant frequency, $f_o$, of the crystal, the voltage applied to the grid 19, of the tube 16, will be in phase with the reference signal voltage. This condition is shown vectorily in Figure 2 wherein the GA and GD represent the voltages across the points G to A and G to D, respectively, identified in Figure 1. When the frequency of the incoming signal is less than the crystal frequency, $f<f_o$, then the crystal is capacitive and the voltage GD across the grid leads the reference voltage. Also, when the frequency of the incoming signal is greater than the crystal frequency, $f>f_o$, the crystal is inductive and the voltage GA on the grid lags the reference voltage, These conditions are also shown in Figure 2, it being pointed out that voltage GA actually applied to the grid is that generated in the one half of the transformer secondary winding and, therefore, is equal to one half of the total secondary voltage BA.

The grid 20, of the tube 16, is energized by a voltage that is displaced 90 degrees from that developed in the transformer secondary winding. As shown in Figure 1, the capacitor 30 and the adjustable resistor 31 are connected across the ends of the transformer secondary winding 15 upon closure of the two blade or double-pole, double-throw reversing switch 32. Under normal conditions, when the switch is closed to the left, the voltage G to C applied to the grid through the lead 33 leads the reference voltage by 90 degrees. This condition is shown in Figure 3 wherein the vector lines BA, GA and GC correspond to the voltages across the correspondingly identified points in the Figure 1 circuit diagram. Specifically, the voltage BA is the voltage output of the transformer secondary winding and constitutes the reference voltage, the voltage GA is that applied to the grid 19 when the frequency of the reference voltage is equal to the natural frequency of the crystal 24, and the voltage GC is that applied to the grid 20 through the 90 degree phase shift network and which, therefore, leads the reference voltage by 90 degrees. When the reversing switch is closed to the right the positions of the capacitor 30 and adjustable resistor 31 are reversed, the adjustable resistor 35 is cut in, and the voltage applied to the grid 20 lags the reference voltage by 90 degrees.

Figure 4 illustrates the relative phase relation of the voltage applied to both grids 19 and 20 when the reversing switch is closed to the normal or left position. It is apparent that when the frequency $f$ of the incoming signal is less than the crystal frequency $f_0$ the voltages on the two grids (GC and GA) are more in phase than under the other conditions wherein the incoming signal frequency is equal to or more than the crystal frequency. Hence, the plate current pulses in the tube will be wider resulting in a greater average plate current flow and a lower plate voltage. When the frequency of the incoming signal is greater than the crystal frequency voltages applied to the two grids are less in phase whereupon the current pulses are narrower, the average plate current flow is less, and the D.C. plate voltage is higher. When $f=f_0$ a condition somewhere in between occurs and this represents the cross-over point of the discriminator.

If the incoming signal is a frequency shift teletype transmission with its center (carrier) frequency approximately equal to $f_0$ (crystal frequency) the Mark and Space frequencies will be converted in the discriminator to D.-C. output pulses. Because of the sharp shift in phase of the crystal a small shift in the frequency of the incoming signal produces a relatively high output pulse. This is shown in the Figure 5. It will be noted here that at the cross-over point the plate voltage of the gated beam tube is about 132 volts, which condition obtains when the frequency of the incoming signal is equal to the crystal frequency $f_0$. When the frequency of the incoming signal shifts by only 0.05 percent above or below the crystal frequency the plate output voltage changes to 34 and 220 volts, respectively, as shown by the curve marked Normal. Such Normal condition prevails when the voltage applied to the grid 20, see Figure 1, leads the reference voltage developed in the secondary winding of the transformer 12. The plate output voltage change shown by the curve marked Reverse is obtained when the switch 32 (Figure 1) is reversed to thereby apply a voltage to the grid 20 that lags the reference voltage. Such reversal of the switch results in a reversal of the polarity of the D.-C. pulses in the plate circuit with the same input signal.

The plate output voltage change of 100 volts in response to a 0.05 percent change in the frequency of the incoming signal makes my circuit ideal for operation as a true IF discriminator for teletype use since the average frequency shift on radio teletype circuits is 850 cycles, which is 0.17% of 500 kilocycles, a much used IF frequency. This provides obvious advantages in that the discriminator can operate directly from the IF output stage without heterodyning the signals down to a lower frequency as is now done in existing circuits of this class.

It may here be pointed out that the voltage relationships shown in Figures 2, 3 and 4 are based upon several assumptions. The impedance of the tuned circuit was treated as resistive throughout the operating range of the circuit, the secondary winding of the transformer 12 was taken as totally resistive, the 90 degree phase shift in the network comprising capacitor 30 and resistance 31 was assumed to be constant over the circuit operating range, and the inter-electrode capacities in the tube 16 were ignored. In a practical sense, these assumptions are only partially valid and the actual phase relationships shown in Figures 1 to 3 vary somewhat from those actually shown. However, the values of the resistors 31 and 35 can be adjusted to provide a practical degree of compensation for these variables.

The sensitivity of the circuit is controlled by the resistor 36 which varies the Q of the L-C circuit 26 whereby a selected change in the output voltage will be produced upon a given shift in the frequency of the applied signal. The maximum circuit sensitivity is obtained when the impedance of the circuit 26 matches that of the crystal at the crystal frequency.

The cathode resistor 21 is designed to bias the grid 22, of the tube 16, beyond the cut-off point when no signal is applied to the grids 19 and 20, as in the case of a signal fade or when the associated receiver is tuned between stations. When the tube is cut-off in this manner its output voltages rise toward the B+ biasing potential. This corresponds to the relatively high level of the output voltage when a Mark signal is applied to the discriminator, as shown in Figure 4. The amplifier energized by the output voltage of the discriminator is arranged so that only Mark signals are effective to cause actuation of the teleprinter selector magnet mechanism in the form of D.-C. current pulses. Consequently, when the tube 16 is cut off by the grid 22 there results an automatic mark-hold condition on the printer, a standard requirement on present teleprinters.

From the foregoing description of the circuit and its particular adaptability to teletype and teleprinter receivers, those skilled in this art will recognize the following practical features thereof over existing converter-discriminator arrangements;

(1) A substantial savings in cost, space and maintenance due to the elimination of the need for heterodyning the applied signal to a lower frequency;

(2) Greater stability due to the use of a crystal as the principal frequency determining component;

(3) The circuit will tolerate a greater frequency drift in the transmitter or receiver because of its sharp response characteristic and when such frequency drift is encountered the distortion introduced is relatively small;

(4) The circuit provides an automatic mark-hold feature by the automatic cut-off of the tube when no signal is applied to the control grids;

(5) The inclusion of the reverse-normal switch in the discriminator circuit eliminates the need for a polarity reversal arrangement in the associated amplifier;

(6) Since the A.-C. voltages in the discriminator circuit are relatively high in frequency they are easily filtered out thereby eliminating the need for large capacitors and long time constants that limit the speed of signal transmission;

(7) The circuit operates over a wide range of frequency shifts without the need of conventional switching and circuit readjustments.

While I have described my discriminator circuit in connection with a Mark and Space, frequency shift teleprinter, it will be apparent the circuit is of general application in the communication and control fields wherein a shift in the frequency of a received signal is converted to a change in a D.-C. voltage or into D.-C. voltage pulses.

Having now given a detailed description of my invention in accordance with the requirements of the patent statutes what I desire to secure by Letters Patent of the United States is set forth in the following claims.

I claim:

1. Apparatus for producing a variation in a direct current output voltage in accordance with a variation in the frequency of a signal from a predetermined reference frequency comprising an electron tube having a cathode, an anode and two control grids, a direct current voltage source biasing the anode through a resistor, a first current path including a reactive network energized by the signal, means deriving a first voltage from the current flowing in the reactive network, means applying said first voltage to one of the control grids, a second current path including a crystal resonant at the reference frequency and energized by the signal, means deriving a second voltage from the current flowing in the crystal, means applying the said second voltage to the other control grid, a tuned circuit including an inductance and having one side connected to the negative side of the said voltage source, and means connecting the other side of the tuned circuit to the other control grid and to one side of the crystal.

2. The invention as recited in claim 1, including a capacitor connected in series with the crystal, and a resistor connected in series with the inductance of the tuned circuit.

3. An electronic circuit for converting variations in the frequency of an applied signal to variations in a direct current output voltage comprising a transformer having a primary winding energized by the applied signal and a secondary winding, an electron tube having a cathode, an anode and two control grids, a direct current voltage source having its positive terminal connected to the anode through a resistor and its negative terminal connected to a tap on the transformer secondary winding, a phase shift network comprising a reactor and a resistor connected in series across the secondary coil, means connecting the junction between the said series connected reactor and resistor to one control grid, a crystal connected across the secondary winding, a tuned circuit connected on one side to the negative terminal of the said voltage source, and means connecting the other side of the tuned circuit to the other control grid and to one side of the crystal.

4. The invention as recited in claim 3, including a capacitor connected in series with the crystal and wherein the tuned circuit is resonant at the resonant frequency of the crystal.

5. An electronic circuit for converting variations in the frequency of an applied signal to variations in a direct current output voltage comprising a transformer having a primary winding energized by the applied signal and a secondary winding; an electron tube having a cathode, an anode and three grids; a direct current voltage source having its positive terminal connected to the anode through a load impedance and its negative terminal connected to a tap on the said secondary winding; a first resistor inserted in the cathode circuit, a first capacitor connected between the said first resistor and a first one of the control grids; a phase shift network comprising a reactance and a second resistor connected in series; circuit elements including a reversing switch connecting the phase shift network across the secondary winding; means connecting the junction between the said reactance and second resistor to a second of the said grids; a crystal and a second capacitor connected in series across the secondary winding; a tuned circuit resonant at a frequency substantially the same as the resonant frequency of the crystal, one side of said tuned circuit being connected to the negative terminal of the said voltage source;

and means connecting a third one of the grids to the other side of the tuned circuit and to the junction between the said crystal and second capacitor.

6. An electronic circuit for converting variations in the frequency of an applied signal to variations in a direct current output voltage comprising a first electron tube having a cathode, an anode and a plurality of grids, means for impressing said signal on one of said grids, an output transformer with a primary winding and a secondary winding having a center tap, a first capacitor adjustable and with its terminals connected by leads to the respective terminals of said primary winding for tuning purposes, a direct current voltage source, means connecting one of said leads to the anode of said tube and the other lead to the positive side of the voltage source and through a first resistor to another grid of said first tube, a second electron tube having a cathode, an anode and three grids, the positive terminal of said voltage source being connected to the anode of said second tube through a load impedance and the negative terminal thereof being connected to the center tap of said secondary winding; a second resistor in the circuit to the cathode of said second tube, a second capacitor in the circuit between said second resistor and a first grid of the second tube, a phase shift network comprising a reactance and a third resistor connected in series, circuit elements including a two blade reversing switch connecting the phase shift network across the secondary winding, means connecting the junction between the said reactance and third resistor to a second grid of said second tube, a crystal and a third capacitor connected in series across the secondary winding, a tuned circuit resonant at a frequency substantially the same as the resonant frequency of the crystal, one side of said tuned circuit being connected to the negative terminal of said voltage source, and means connecting the third grid of the second tube to the other side of the tuned circuit and to the junction between the said crystal and third capacitor.

7. The invention as recited in claim 6, in which a fourth resistor connects diagonally-opposite terminals alternatively engageable by said reversing switch.

8. The invention as recited in claim 6, in which the anode of the second tube is grounded through a filtering condenser.

9. Apparatus for producing a variation in a direct current voltage in accordance with the frequency variation of an applied signal voltage from a predetermined reference frequency, said apparatus comprising an electron tube having a cathode, an anode and two control grids, a direct current voltage source connected to the anode through a resistor, means impressing a first voltage on one grid of the tube which voltage is displaced substantially 90 degrees relative to the applied signal voltage over the useful frequency range of the said applied signal voltage, and means impressing a second voltage on the other grid of the tube which voltage varies in phase relative to the said applied signal voltage in accordance with a deviation of the signal voltage frequency from the reference frequency, the said last mentioned means including a crystal resonant at the reference frequency, and including a tuned circuit connected between the said other grid and the negative side of the direct current voltage source.

References Cited in the file of this patent

UNITED STATES PATENTS

| | | |
|---|---|---|
| 2,205,847 | Crosby | June 25, 1940 |
| 2,273,771 | Hunt | Feb. 17, 1942 |
| 2,274,184 | Bach | Feb. 24, 1942 |
| 2,411,605 | Webb | Nov. 26, 1946 |
| 2,617,022 | Overbeek | Nov. 4, 1952 |
| 2,662,179 | Hepp | Dec. 8, 1953 |